United States Patent
Suzio et al.

[11] Patent Number: 5,739,499
[45] Date of Patent: Apr. 14, 1998

[54] WELD GUN COUNTERBALANCE APPARATUS

[75] Inventors: Richard F. Suzio, Canton; Michael S. McFadden, Clinton Township; Ronald R. Hendricks, Hazel Park, all of Mich.

[73] Assignee: Progressive Tool & Industries Company, Southfield, Mich.

[21] Appl. No.: 713,249

[22] Filed: Sep. 12, 1996

[51] Int. Cl.[6] ................................................ B23K 11/00
[52] U.S. Cl. .................................... 219/90; 219/86.25
[58] Field of Search ........................... 219/86.25, 89, 219/90, 91.1, 86.61, 116

[56] References Cited

U.S. PATENT DOCUMENTS

| | | | |
|---|---|---|---|
| 1,980,228 | 8/1934 | Rogers | 219/89 |
| 3,798,407 | 3/1974 | Becker | 219/92 |
| 4,367,397 | 1/1983 | Henderson | 219/234 |
| 4,485,289 | 11/1984 | Schwartz | 219/90 |
| 4,656,327 | 4/1987 | Wilcox | 219/86.21 |
| 4,771,160 | 9/1988 | Pitsch et al. | 219/90 |
| 4,810,849 | 3/1989 | Heideman | 219/89 |
| 4,825,031 | 4/1989 | Heideman | 219/89 |
| 5,128,510 | 7/1992 | De Bruyn et al. | 219/89 |
| 5,164,564 | 11/1992 | Umeda | 219/86.25 |
| 5,198,633 | 3/1993 | Umeda | 219/89 |
| 5,252,801 | 10/1993 | Angel et al. | 29/86.61 |

FOREIGN PATENT DOCUMENTS

| | | |
|---|---|---|
| 2673131 | 8/1992 | France . |
| 2686535 | 7/1993 | France . |
| 1564669 | 4/1980 | United Kingdom . |

*Primary Examiner*—Adolf Berhane
*Attorney, Agent, or Firm*—Young & Basile, P.C.

[57] ABSTRACT

A pair of tongs position the first and second electrodes with respect to the workpiece while the tongs rotate with respect to one another about a pivot axis. A counterbalancing mechanism balances the first and second electrodes when in or in close proximity to, the welding position, where the electrodes compressively engage opposite sides of the workpiece during the welding operation. The counterbalancing mechanism is disposed with respect to the pivot axis for biasing one of the tongs in a rotational direction with respect to the pivot axis, such that the weld gun apparatus including the pair of tongs and tong actuator are balanced about the pivot axis when in the closed position. The counterbalance mechanism may include a torsion spring connected to the pivot pin defining the pivot axis. The biasing force of the torsion spring may be adjusted to achieve the desired counterbalancing force to balance the weight of the weld gun assembly about the pivot pin.

20 Claims, 2 Drawing Sheets

WELD GUN COUNTERBALANCE APPARATUS

FIELD OF THE INVENTION

The present invention generally relates to welding guns suitable for use on automated assembly lines, and more particularly, to a welding gun having a pair of electrodes movable toward opposite sides of a workpiece for applying pressure while the workpiece is being welded.

BACKGROUND OF THE INVENTION

Resistance welding guns are widely used to form permanent assemblies in mass production assembly lines. For example, resistance welding guns can be used on automated automobile assembly lines where body panels, such as doors and hoods, are welded to support structures to form subassemblies, which are then welded to the frame of an automobile. The frame for automobile bodies can be a complex structure of stamped steel metal sections which are welded together to form the framework to which the outer body panels are attached.

Resistance welding uses the application of heat and pressure to bond two or more sheets or panels, without the use of a flux or filler metal, to form a permanent joint. The necessary heat is generated by the resistance of the metal sheets to flow of electric current. Conventional resistance welding guns include replaceable electrodes which serve as terminals for an electric circuit. The electrodes typically are formed from copper which is alloyed with metals to provide the desired electrically and thermally conductive properties, while at the same time providing sufficient strength to withstand the high application forces associated with holding the metal panels for welding. During the welding process, opposing electrodes are brought into contact with opposite sides of the sheet to be welded. An electric current is then passed through the electrodes and through the metal sheets. The magnitude of the electric current is sufficient to locally heat and melt the panels so as to fuse the panels to each other between the points Where the electrodes make contact with the panels. Direct or alternating current may be used depending on the particular requirements of the application and the electrode material used.

SUMMARY OF THE INVENTION

The present invention relates to an apparatus for bonding a workpiece with pressure applied by first and second electrodes contacting and loading opposite sides of the workpiece during a welding operation. The apparatus includes a pair of tongs for positioning the first and second electrodes with respect to the workpiece to contact and load opposite sides of the workpiece while the tongs rotate or articulate with respect to one another about a pivot axis and means for counterbalancing the pair of tongs when at the closed or welding position prior to application of welding pressure of the first and second electrodes to opposite sides of the workpiece. The counterbalancing apparatus of the present invention facilitates a smooth approach of the welding tips connected to the electrodes to the workpiece, which is positioned precisely on a predefined workplane or within a given range of deviation from the workplane (typically ±5° or at most ±7°), compensation for tip wear of the electrodes, ensuring operation of the welding gun regardless of angular position, and opening of the jaws or tongs during an opening cycle. The counterbalancing apparatus according to the present invention fulfills the function of balancing the weld gun with respect to a pivot axis when positioned at or immediately adjacent the welding or closed position of the pair of tongs. Furthermore, the counterbalancing apparatus according to the present invention can accommodate rotation of relatively large angles about the pivot axis and fixation in a new welding position with minimal setup effort since the spring biasing force is adjustable to achieve balancing of the weld gun in the reconfigured closed position. This has the added benefit of reducing the number of different designs for welding guns required, since the same design can be used for various angles of operation and can be used for robot applications.

According to the present invention, the counterbalance mechanism is insulated with respect to the jaws of the welding gun. During welding, the counterbalancing apparatus will be located in a zone of powerful electromagnetic fields created by high currents going between the circuit of the transformer and the jaws. A spring located in a powerful electromagnetic field may generate eddy currents and potentially lead to premature failure. If necessary to prevent premature failure, a spring according to the present invention in the pivot area may be formed of non-magnetic and non-electro-conductive spring material. For example, springs may be made of composite material, such as carbon plastic fiber or fiber-glass, could be used.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a partial cross-sectional view of the counterbalancing apparatus taken as shown in FIG. 1,

DESCRIPTION OF THE PREFERRED EMBODIMENT

Figure 1:
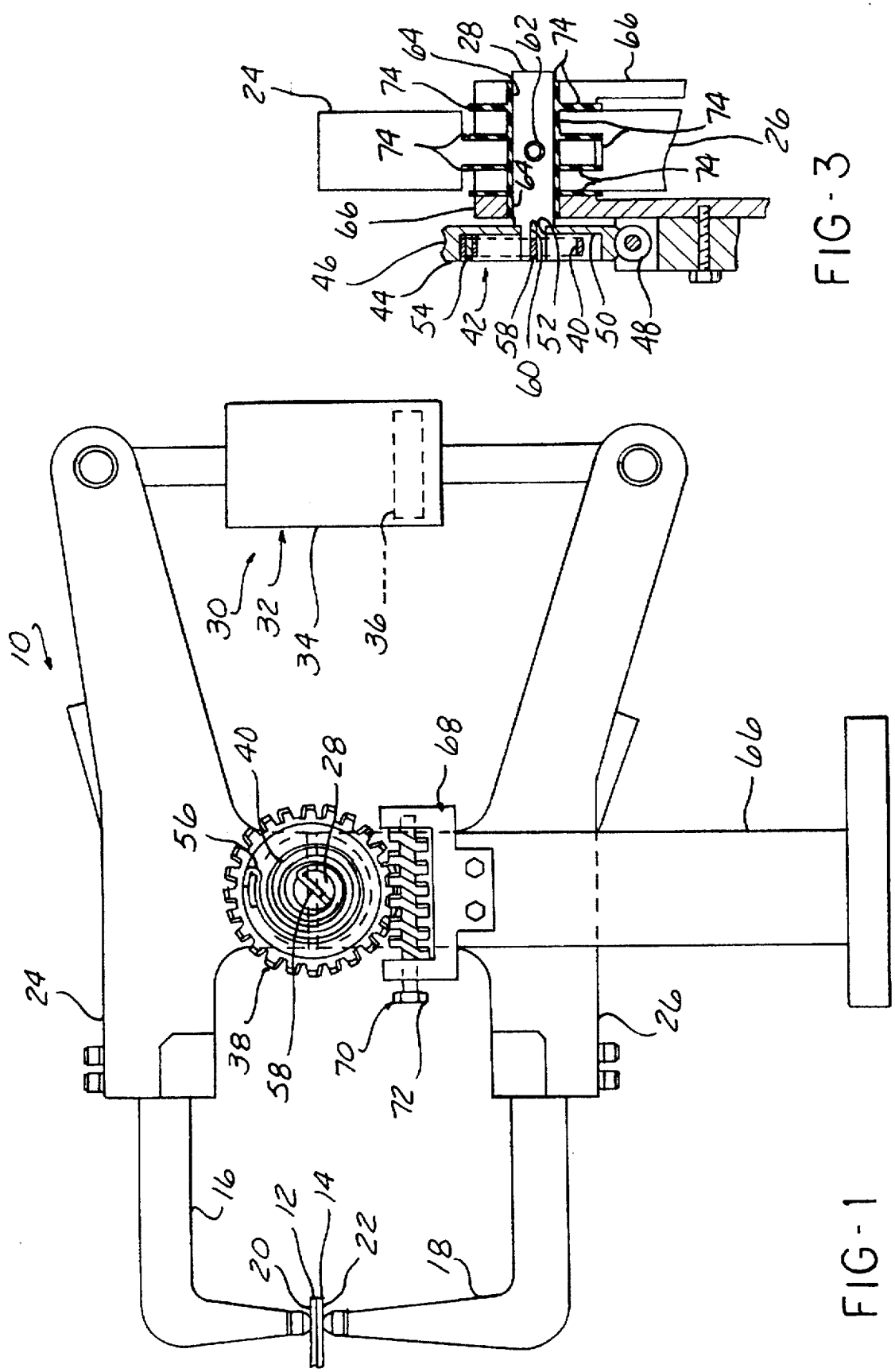
FIG. 1 is a side elevational view of a counterbalancing apparatus according to the present invention with the tongs in a closed position.

A weld gun apparatus 10 according to the present invention bonds a workpiece, such as work elements 12 and 14, with pressure applied by first and second electrodes 16, 18 contacting and loading opposite sides 20, 22 of the workpiece during a welding operation. A pair of tongs 24, 26 position the first and second electrodes 16, 18 with respect to the workpiece 12, 14 to contact and load opposite sides 20, 22 of the workpiece 12, 14 while the tongs 24, 26 rotate with respect to one another about a pivot axis, such as pivot pin 28.

Figure 2:
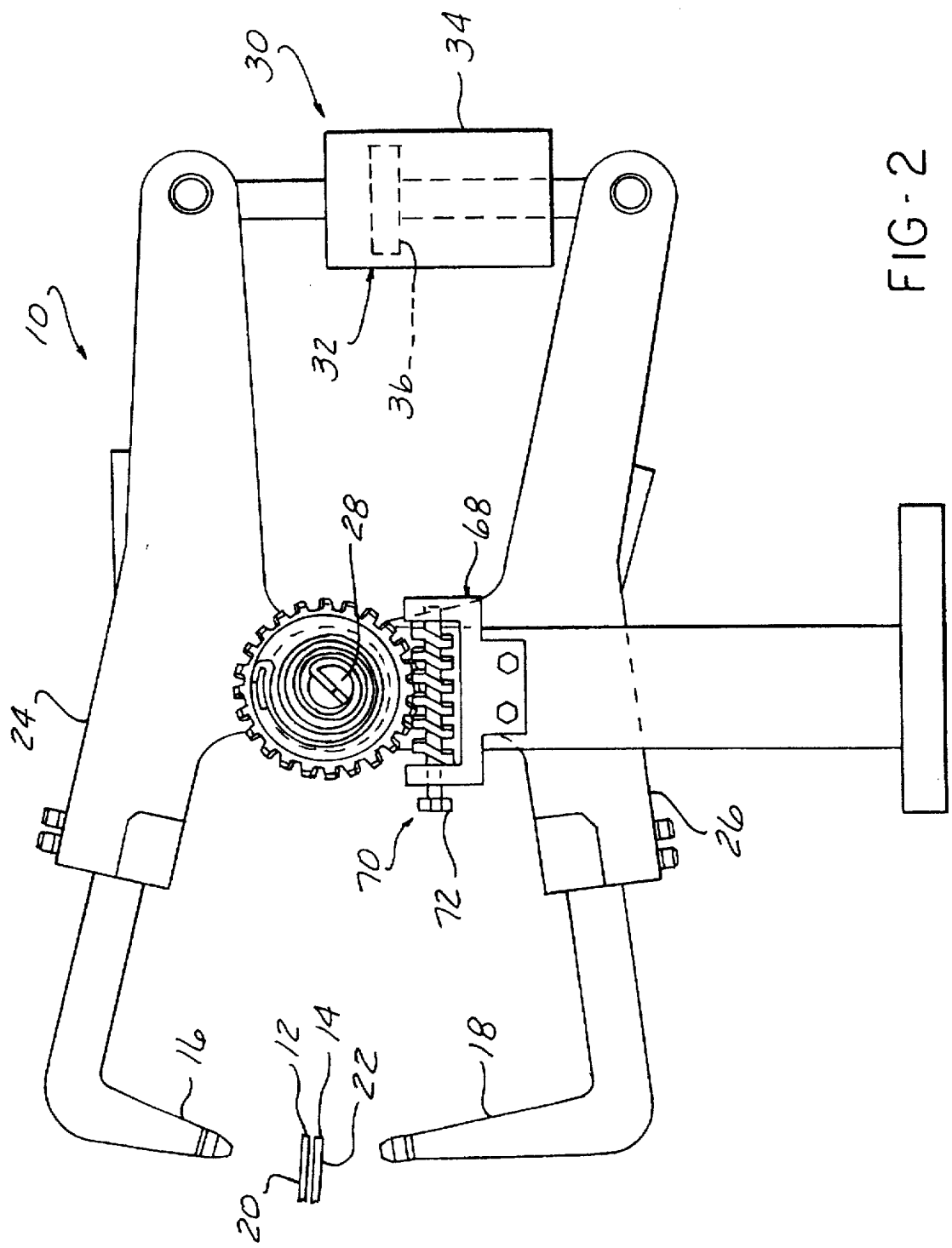
FIG. 2 is a side elevational view of the counterbalancing apparatus according to FIG. 1 with the tongs in an open position.

The weld gun apparatus 10 according to the present invention centers the pair of tongs 24, 26 relative to a predetermined planar position for the welding operation to be conducted on the workpiece. The tongs 24, 26 when placed in an open position with respect to the predetermined planar position, permit the workpiece elements 12, 14 to be inserted, properly positioned and clamped, if necessary. The weld gun apparatus 10 ensures alignment of the welding electrodes at the desired position for welding the workpiece and compression of the work elements 12, 14 together required for welding. After welding, the weld gun apparatus 10 ensures separation of the electrodes from the workpiece to allow removal of the welded workpiece and installation of new work elements for welding. The electrodes 16, 18 carried by opposing ends of the pair of tongs 24, 26 approach the predefined welding position relatively precisely while allowing for a small deflection, or self adjustment, to compensate for variations in work element dimensions as well as to reduce, or preferably eliminate deformation of the work elements 12, 14, in those cases when the work elements are slightly out of the predefined welding plane. In operation, the pair of tongs 24, 26 are initially in the position as illustrated in FIG. 2 with the electrodes 16, 18 spaced from the work elements 12, 14 being inserted into the workstation for welding. Appropriate stop limits (not shown) may be provided for limiting rotational movement toward the fully open position for each of the pair of tongs 24, 26 as shown in FIG. 2.

Means 30 is provided for driving the pair of tongs 24, 26 with respect to the pivot axis to move the electrodes 16, 18 toward and away from one another to contact and load opposite sides 20, 22 of the work elements 12, 14 during the welding operation. The driving means 30 can include a pressure actuated means 32 for moving the electrodes 16, 18, such as a pneumatic or hydraulic cylinder 34 and associated plunger 36. After pressure is supplied into the pneumatic or hydraulic cylinder 34, the plunger 36 is pushed outward with respect to the pneumatic or hydraulic cylinder 34 which may result in one or both tongs rotating about pivot pin 28. The driving means 30 can also include electric means, such as an electric reversible servo-motor for moving the electrodes 16, 18.

The counterbalance mechanism compensates for the weight of the weld gun and for inertia to greatly reduce the potential for damage to the product to be welded. The pneumatic cylinder 34 and plunger 36 then load the opposite sides 20, 22 of the work elements 12, 14 by compressing the work elements between the first and second electrodes 16, 18 with sufficient pressure or force during the application of electric current therethrough to complete the welding operation. The welding operation is accomplished by heating the workpiece with electric current passing through the first and second electrodes 16, 18 and through the work elements 12, 14 producing a weld cross-section which is generally circular.

With the welding gun apparatus 10 now in the position as illustrated in FIG. 1, the pair of tongs 24, 26 are in a closed position during the welding operation. After welding is completed, pressure is supplied to the pneumatic or hydraulic cylinder 34 to draw the plunger 36 into the cylinder 34. In the case of an electric servo-motor, power is applied to the motor to reverse the rotation of the motor and drive the electrodes 16, 18 away from one another. By way of example and not limitation, the tongs 24, 26 separate from the workpiece generally simultaneously since the weld gun apparatus is in a balanced condition about pivot pin 28 when in or immediately adjacent the closed welding position. One of the tongs, such as tong 26 may travel about pivot pin 28 further than the other tong until the tong reaches a rotational limit, placing the weld gun apparatus 10 generally in the open position shown in FIG. 2. It is believed that the tong connected to the counterbalancing means 38 will preferably be the tong that travels a shorter rotational distance between open and closed positions. The tongs 24, 26 may be moved to an intermediate open position (not shown) to allow movement of the weld gun apparatus along the joint of the workpiece formed by the work elements 12, 14 for performing multiple welds before opening the tongs 24, 26 to the fully open position of FIG. 2 for removal of the finished, welded workpiece and insertion of new work elements 12, 14 to be welded.

Means 38 is provided for counterbalancing the effective weight or mass and moment force of the weld gun, including tongs 24, 26, electrodes, 16, 18 and driving means 30 with respect to the pivot pin 28. The counterbalancing means 38 is disposed with respect to the pivot axis, such as pivot pin 28, for balancing the tongs 24, 26, electrodes 16, 18 and driving means 30 with respect to the pivot axis when in, or immediately adjacent to, the closed or welding position. Preferably, the counterbalancing means 38 includes a torsion spring 40 positioned about the pivot axis and operably connected to one of the pair of tongs 24, 26 at one end of the spring. As best seen in FIGS. 1 and 3, the torsion spring 40 is enclosed within a housing 42 having a generally cylindrical wall 44 with gear teeth 46 formed around at least a portion of the external periphery thereof. The gear teeth 46 preferably extend around the entire external periphery of the cylindrical wall 44 of the housing 42. In addition, the gear teeth 46 preferably take the form of zero-backlash teeth for engagement with a driving gear 48, such as a worm gear, which may take the form of a double enveloping worm gear and gear teeth combination. Preferably, the gear teeth 46 and driving gear 48 have zero backlash and are self-locking in either rotational direction. The housing 42 has at least one radially extending end wall 50 with an aperture 52 formed therein for rotatably receiving a portion of the pivot pin 28 so that the pivot pin 28 can rotate independently of the housing 42.

Within the housing 42, a spring seat 54 is formed for engaging and anchoring one end 56 of the torsion spring 40. The spring seat 54 may take the form of an axially extending protrusion from the radially extending end wall 50 adjacent the inner surface of the cylindrical wall 44 of housing 42 as best seen in FIGS. 1 and 3. The opposite end 58 of the torsion spring 40 is engaged within an axially extending slot 60 formed in an outer end of the pivot pin 28 engaged within the housing 42. The pivot pin 28 is connected to one of the pair of tongs, such as tong 24 by suitable means, such as connection pin 62. The connection pin 62 couples the pivot pin 28 and tong 24 to one another so that the biasing action of the torsion spring 40 acting on pivot pin 28 results in balancing rotational forces acting on the tong 24 including the rotational force imparted by gravitation forces acting on the effective weight or mass of the actuating means 32 and connected tong 26. The other tong 26 is rotatably connected about pivot pin 28. Pivot pin 28 is supported through one or more apertures 64 formed in a support bracket 66 for supporting the weld gun apparatus 10 in any desired position and orientation. The driving gear 48 is rotatably supported by a gear housing 68 connected to the support bracket 66. Means 70 is provided for adjusting the balancing or biasing force of the torsion spring 40. The adjusting means 70 can be manually actuated, or automated if desired. As shown in FIG. 1, the adjusting means 70 can include an outwardly extending end of the shaft fixedly connected to the driving gear 48 having a hex head 72, or other suitable member 72 capable of being driven, such as a spline, slot, socket, or the like. The member 72 is fixedly connected to the driving gear 48 allowing rotation of the worm gear with a manual wrench, power driven socket or other suitable driver.

Rotation of the driving gear 48 by engagement with the hex head 72 causes corresponding rotation in the housing 42 through meshing engagement of the gear teeth 46 formed on the external periphery of the housing 42 with the driving gear 48. The one end 56 of the torsion spring 40 engaged with spring seat 54 formed with or connected to the housing 42 causes a corresponding change in torsional biasing force depending on the direction of rotation of the housing 42. As shown in FIG. 1, rotation of the housing 42 in the clockwise direction increases the torsional biasing force, while rotation of the housing 42 in the counter-clockwise direction causes a reduction in the torsional biasing force of torsion spring 40. If required, the torsion spring 40 can be positioned in housing 42 with a counter-clockwise spiral orientation, rather than the clockwise spiral orientation as shown in FIGS. 1 and 2. Depending on the placement, either clockwise or counterclockwise, of the torsion spring 40 in the housing, the torsional biasing force can be increased by rotation in a first direction and can be decreased by rotation in an opposite second direction. Means 74 for insulating is provided to electrically isolate the pair of tongs 24, 26 from one another and to isolate the pair of tongs 24, 26 from the pivot pin 28, counterbalancing means 38 and support bracket 66.

In operation, the torsion spring 40 counterbalances the distributed weight of the pair of tongs 24, 26 and driving means 30 with respect to pivot pin 28 when in the closed position as illustrated in FIG. 1. This counterbalancing prevents undue force or impact of the electrodes 16, 18 with the opposite sides 20, 22 of the work elements 12 and 14 while moving to the closed position of FIG. 1 from the open position of FIG. 2. Once the torsion spring 40 biasing force is set to the appropriate amount in order to accomplish counterbalancing when in the closed position as illustrated in FIG. 1, no further adjustment of the torsion spring 40 should be necessary. Currently, high carbon content steel torsion springs 40 are being tested in order to determine the expected lifetime between failure, and to determine the desirability of using non-magnetic and/or non-electroconductive torsion springs made of composite material, such as a carbon plastic fiber or fiber-glass.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for bonding a workpiece with pressure applied by first and second electrodes contacting and loading opposite sides of said workpiece during a welding operation comprising:

a pair of tongs for positioning said first and second electrodes with respect to said workpiece to contact and load opposite sides of said workpiece when in a closed welding position, while said tongs rotate with respect to one another about a pivot axis; and means for counterbalancing said pair of tongs while carrying said first and second electrodes for engagement with opposite sides of said workpiece, said counterbalancing means disposed with respect to said pivot axis for biasing one of said tongs in a rotational direction with respect to said pivot axis, such that said counterbalancing means balances said pair of tongs in any angular orientation of said closed welding position with respect to said pivot axis.

2. The apparatus of claim 1 further comprising:

means for adjusting a balancing force applied to the one tong allowing said pair of tongs to be balanced with respect to said pivot axis in any one of a plurality of angular positions of said tongs about said pivot axis.

3. The apparatus of claim 1 further comprising:

said counterbalancing means including a torsion spring having a first end and a second end, said torsion spring disposed about said pivot axis and having said first end connected to one of said pair of tongs at said pivot axis.

4. The apparatus of claim 3 further comprising:

means for adjusting torsional preload of said torsion spring acting on said one of said tongs.

5. The apparatus of claim 1 further comprising:

means for driving said tongs with respect to said pivot axis to move said first and second electrodes toward and away from one another.

6. The apparatus of claim 5 further comprising:

said driving means including pressure actuated means for moving said first and second electrodes mounted on opposing jaws of said tongs toward and away from one another.

7. The apparatus of claim 1 further comprising:

means for electrically insulating the pair of tongs from one another, from the pivot axis and from the counterbalancing means.

8. An apparatus for bonding a workpiece with pressure applied by first and second electrodes contacting and loading opposite sides of said workpiece during a welding operation comprising:

a pair of tongs for positioning said first and second electrodes with respect to said workpiece to contact and load opposite sides of said workpiece while said tongs rotate with respect to one another about a pivot axis;

a pivot pin connected to one tong of said pair of tongs and pivotally supporting the other tong for pivotal movement with respect to said pivot axis; and means for counterbalancing said pair of tongs while carrying said first and second electrodes for engagement with opposite sides of said workpiece, said counterbalancing means disposed with respect to said pivot axis for biasing one of said tongs in a rotational direction with respect to said pivot axis, said counterbalancing means connected to said pivot pin for biasing said pivot pin in a rotational direction with sufficient force to balance said pair of tongs in an angular position with respect to said pivot axis.

9. An apparatus for bonding a workpiece with pressure applied by first and second electrodes contacting and loading opposite sides of said workpiece during a welding operation comprising:

a pair of tongs for positioning said first and second electrodes with respect to said workpiece to contact and load opposite sides of said workpiece while said tongs rotate with respect to one another about a pivot axis;

means for counterbalancing said pair of tongs while carrying said first and second electrodes for engagement with opposite sides of said workpiece, said counterbalancing means disposed with respect to said pivot axis for biasing one of said tongs in a rotational direction with respect to said pivot axis, said counterbalancing means including a torsion spring having a first end and a second end, said torsion spring disposed about said pivot axis and having said first end connected to one of said pair of tongs at said pivot axis; and means for adjusting torsional preload of said torsion spring acting on said one of said tongs, said adjusting means including a generally cylindrical member supporting another end of said torsion spring and having a plurality of teeth on an external circumference thereof, and a drive gear engageable with said teeth for rotating said cylindrical member with respect to said one end of said spring connected to said one of said pair of tongs.

10. An apparatus for bonding a workpiece with pressure applied by first and second electrodes contacting and loading opposite sides of said workpiece during a welding operation comprising:

a pair of tongs for positioning said first and second electrodes with respect to said workpiece to contact and load opposite sides of said workpiece in a closed welding position, while said tongs articulate with respect to one another about a pivot axis, said closed welding position selectable in any angular orientation with respect to said pivot axis; and torsion spring means for counterbalancing said pair of tongs while carrying said first and second electrodes for engagement with opposite sides of said workpiece, said torsion spring counterbalancing means disposed about said pivot axis and connected to one of said pair of tongs at one end for biasing said one tong in a rotational direction with respect to said pivot axis, such that said counterbalancing means balances said pair of tongs in said selected angular orientation of said closed welding position with respect to said pivot axis.

11. The apparatus of claim 10 further comprising:

means for adjusting a balancing force applied to the one tong by said torsion spring counterbalancing means allowing said pair of tongs to be balanced with respect to said pivot axis in any one of a plurality of angular positions of said tongs about said pivot axis.

12. The apparatus of claim 10 further comprising:

means for adjusting torsional preload of said torsion spring counterbalancing means acting on said one tong.

13. The apparatus of claim 10 further comprising:

means for driving said tongs with respect to said pivot axis to move said first and second electrodes toward and away from one another.

14. The apparatus of claim 13 further comprising:

said driving means including pressure actuated means for moving said first and second electrodes mounted on opposing jaws of said tongs toward and away from one another.

15. The apparatus of claim 10 further comprising:

means for electrically insulating the pair of tongs from one another, from the pivot axis and from the counterbalancing means.

16. An apparatus for bonding a workpiece with pressure applied by first and second electrodes contacting and loading opposite sides of said workpiece during a welding operation comprising:

a pair of tongs for positioning said first and second electrodes with respect to said workpiece to contact and load opposite sides of said workpiece while said tongs articulate with respect to one another about a pivot axis;

a pivot pin connected to said one tong and pivotally supporting the other tong for pivotal movement with respect to said pivot axis; and torsion spring means for counterbalancing said pair of tongs while carrying said first and second electrodes for engagement with opposite sides of said workpiece, said torsion spring counterbalancing means disposed about said pivot axis and connected to one of said pair of tongs at one end for biasing said one tong in a rotational direction with respect to said pivot axis, said torsion spring counterbalancing means connected to said pivot pin for biasing said pivot pin in a rotational direction with sufficient force to balance said pair of tongs in an angular position with respect to said pivot axis.

17. An apparatus for bonding a workpiece with pressure applied by first and second electrodes contacting and loading opposite sides of said workpiece during a welding operation comprising:

a pair of tongs for positioning said first and second electrodes with respect to said workpiece to contact and load opposite sides of said workpiece while said tongs articulate with respect to one another about a pivot axis;

torsion spring means for counterbalancing said pair of tongs while carrying said first and second electrodes for engagement with opposite sides of said workpiece, said torsion spring counterbalancing means disposed about said pivot axis and connected to one of said pair of tongs at one end for biasing said one tong in a rotational direction with respect to said pivot axis; and means for adjusting torsional preload of said torsion spring counterbalancing means acting on said one tong, said adjusting means including a generally cylindrical member supporting another end of said torsion spring counterbalancing means and having a plurality of teeth on an external circumference thereof, and a drive gear engageable with said teeth for rotating said cylindrical member with respect to said one end of said torsion spring counterbalancing means connected to said one tong.

18. An apparatus for bonding a workpiece with pressure applied by first and second electrodes contacting and loading opposite sides of said workpiece during a welding operation comprising:

a pair of tongs for positioning said first and second electrodes with respect to said workpiece to contact and load opposite sides of said workpiece when in a closed welding position, while said tongs articulate with respect to one another about a pivot axis, said closed welding position defined at any predetermined angular orientation with respect to said pivot axis;

a pivot pin connected to one tong and pivotally supporting the other tong for pivotal movement with respect to said pivot axis; and means for counterbalancing said pair of tongs while carrying said first and second electrodes for engagement with opposite sides of said workpiece, said counterbalancing means including a torsion spring disposed about said pivot axis and connected to said pivot pin at one end for biasing said one tong in a rotational direction with respect to said pivot axis with sufficient force to balance said pair of tongs in said predetermined angular orientation with respect to said pivot axis corresponding to said closed welding position, such that said counterbalancing means is capable of balancing said pair of tongs in any angular orientation selected with respect to said pivot axis corresponding to said closed welding position.

19. The apparatus of claim 18 further comprising:

means for adjusting a balancing force applied to said one tong by said torsion spring allowing said pair of tongs to be balanced with respect to said pivot pin in any one of a plurality of angular positions of said tongs about said pivot axis.

20. An apparatus for bonding a workpiece with pressure applied by first and second electrodes contacting and loading opposite sides of said workpiece during a welding operation comprising:
- a pair of tongs for positioning said first and second electrodes with respect to said workpiece to contact and load opposite sides of said workpiece while said tongs articulate with respect to one another about a pivot axis;
- a pivot pin connected to one tong and pivotally supporting the other tong for pivotal movement with respect to said pivot axis;
- means for counterbalancing said pair of tongs while carrying said first and second electrodes for engagement with opposite sides of said workpiece, said counterbalancing means including a torsion spring disposed about said pivot axis and connected to said pivot pin at one end for biasing said one tong in a rotational direction with respect to said pivot axis with sufficient force to balance said pair of tongs in an angular position with respect to said pivot axis; and
- means for adjusting a balancing force applied to said one tong by said torsion spring allowing said pair of tongs to be balanced with respect to said pivot pin in any one of a plurality of angular positions of said tongs about said pivot axis, said adjusting means including a generally cylindrical member supporting another end of said torsion spring and having a plurality of teeth on an external circumference thereof, and a drive gear engageable with said teeth for rotating said cylindrical member with respect to said one end of said torsion spring connected to said one tong.

\* \* \* \* \*